United States Patent
Soderstrom et al.

(10) Patent No.: US 10,077,157 B2
(45) Date of Patent: Sep. 18, 2018

(54) STATIC DISSIPATIVE SPROCKET FOR A CONVEYOR BELT SYSTEM

(71) Applicant: AMF AUTOMATION TECHNOLOGIES, LLC, Tucker, GA (US)

(72) Inventors: Kristopher Jon Soderstrom, Lawrenceville, GA (US); Chi Chung, Smyrna, GA (US); William Watson Lavigno, IV, Peachtree Corners, GA (US)

(73) Assignee: AMF AUTOMATION TECHNOLOGIES, LLC, Tucker, GA (US)

( * ) Notice: Subject to any disclaimer, the term of this patent is extended or adjusted under 35 U.S.C. 154(b) by 0 days.

(21) Appl. No.: 15/261,214

(22) Filed: Sep. 9, 2016

(65) Prior Publication Data

US 2017/0073166 A1    Mar. 16, 2017

Related U.S. Application Data

(60) Provisional application No. 62/216,460, filed on Sep. 10, 2015.

(51) Int. Cl.
*B65G 23/06* (2006.01)

(52) U.S. Cl.
CPC .......... *B65G 23/06* (2013.01); *B65G 2207/10* (2013.01)

(58) Field of Classification Search
CPC ............................. B65G 23/06; B65G 2207/10
USPC .................................... 198/832–835; 474/90
See application file for complete search history.

(56) References Cited

U.S. PATENT DOCUMENTS

| | | |
|---|---|---|
| 3,400,988 A | 9/1968 | Hudson et al. |
| 3,611,028 A | 10/1971 | Whitmore |
| 4,196,805 A | 4/1980 | Banno |
| 4,392,177 A | 7/1983 | Geyken |
| 4,664,243 A | 5/1987 | Martin |
| 4,673,380 A | 6/1987 | Wagner |
| 4,681,215 A | 7/1987 | Martin |
| 4,718,154 A | 1/1988 | Bauer et al. |
| 4,793,459 A | 12/1988 | Forknall et al. |
| 5,213,001 A * | 5/1993 | Gruettner ............ F16H 57/0025 403/356 |
| 5,469,958 A | 11/1995 | Gruettner et al. |
| 5,645,155 A | 7/1997 | Houghton |
| 5,934,447 A | 8/1999 | Kanaris |
| 5,957,261 A | 9/1999 | Inoue et al. |
| 6,530,694 B2 * | 3/2003 | Takemura ............ F16C 41/002 384/476 |
| 6,554,117 B2 | 4/2003 | Henson et al. |
| 6,581,759 B1 | 6/2003 | Kalm |
| 6,964,332 B2 | 11/2005 | Verdigets et al. |
| 7,207,436 B1 | 4/2007 | Houghton |

(Continued)

*Primary Examiner* — William R Harp
(74) *Attorney, Agent, or Firm* — Gardner Groff Greenwald & Villanueva, PC

(57) ABSTRACT

In a conveyor belt system, a static dissipative sprocket constructed of a static dissipative plastic material creates a path of conveyance for dissipating static electricity between a conveyor belt and a grounded drive shaft. The static dissipative sprocket includes an attachment collar incorporated into the sprocket as a single unitary component. The static dissipative sprocket can include a set screw and metal insert to assist in the transfer of static electricity from the static dissipative sprocket to the drive shaft.

28 Claims, 4 Drawing Sheets

(56) References Cited

U.S. PATENT DOCUMENTS

| | | | |
|---|---|---|---|
| 7,360,643 B1 * | 4/2008 | Fandella | B65G 17/08 198/321 |
| 7,607,527 B2 | 10/2009 | Yazaki et al. | |
| 9,162,818 B2 * | 10/2015 | van den Berg | B65G 17/08 |
| 2005/0247545 A1 * | 11/2005 | Ni | B65G 13/00 198/780 |
| 2013/0018412 A1 * | 1/2013 | Journey | A61B 17/30 606/206 |
| 2013/0228421 A1 | 9/2013 | Harrelson | |
| 2014/0318932 A1 * | 10/2014 | van den Berg | B65G 17/08 198/853 |

* cited by examiner

STATIC DISSIPATIVE SPROCKET FOR A CONVEYOR BELT SYSTEM

CROSS-REFERENCE TO RELATED APPLICATION

This application claims the benefit of U.S. Provisional Patent Application Ser. No. 62/216,460 filed Sep. 10, 2015, the entirety of which is hereby incorporated herein by reference for all purposes.

TECHNICAL FIELD

The present invention relates generally to conveyor systems and components thereof, and more particularly to a modular plastic conveyor belt system incorporating a static dissipative sprocket.

BACKGROUND

Modular plastic belting has become an industry standard in conveyor belt systems. Such plastic belting can be customized to suit specific industry needs, such as automotive use, hygienic applications, and baking applications. Despite their popularly and success, there are shortcomings in traditional plastic conveyor belt designs. One notable drawback is the build-up of static electricity caused by objects placed on the conveyor belt.

The traditional conveyor belt assembly includes sprockets having inner portions mounted on a metal shaft, for example made of stainless steel. The outer portions of the sprockets have teeth which are in contact with a plastic conveyor belt. As the metal shaft rotates, the sprockets rotate, causing the conveyor belt to move in the direction of rotation of the metal shaft. Each sprocket is held in place on the metal shaft by steel collars arranged on either side of the sprocket. The steel collars are connected to the metal shaft via set-screws or other fasteners. When a metal object such as a baking pan is placed on the conveyor belt and conveyed along the belt, static electricity can be generated. There is typically no grounding in previously known conveyor belt assemblies, so the static electricity builds up as the metal pan is conveyed. This static build-up can be hazardous to personnel and equipment.

While there have been attempts to modify plastic belt systems to dissipate the static electricity, these attempts have generally been unsuccessful. One such attempted solution includes a plastic static dissipative runner, a stainless steel runner support, stainless steel runner clips, bolt holding runner clips, a cross support, an interface between the cross support and the frame, and the frame (including the grounded metal shaft). Because the static electricity has to flow through all these components before reaching ground, this design has generally proven to be ineffective in dissipating the static electricity generated. Also, the metal drive shaft is commonly covered with a passive insulating film in many known systems, which further hinders dissipation of the static electricity.

Thus it can be seen that needs exist for improved conveyor systems. It is to the provision of an improved conveyor system and an improved static dissipative sprocket component for conveyor systems meeting these and other needs that the present invention is primarily directed.

SUMMARY

Generally described, the invention relates to a static dissipative plastic sprocket including a set screw provides a ground from a plastic conveyor belt to the grounded metal frame of a conveyor belt system. The static dissipative plastic sprocket prevents the build-up of static electricity due to metal objects placed on the plastic conveyor belt. This is an improvement over traditional designs, in which the plastic conveyor belt is insulated, causing a hazardous build-up of static electricity.

In one aspect, the present invention relates to a static dissipative sprocket assembly for a conveyor system including a sprocket body including a hub having a central opening defining an inner circumference, a rim concentrically surrounding the hub and having an outer circumference greater than the inner circumference of the hub and a plurality of teeth projecting in a spaced array about the outer circumference of the rim. Preferably, the sprocket body is constructed of a static dissipative material.

In another aspect, the invention relates to a conveyor system with a plastic conveyor belt having a top face and a bottom face and defining a lengthwise direction extending along a conveyance path. The conveyor belt includes at least one array of openings space in the lengthwise direction along the top face and or the bottom face. The system also includes a static dissipative sprocket assembly including a hub having a central opening defining an inner circumference, a rim concentrically surrounding the hub and having an outer circumference, and a plurality of teeth spaced around the outer circumference of the rim for cooperative engagement with the array of openings of the conveyor belt wherein the sprocket body comprises a static dissipative material.

In still another aspect, the invention relates to a method of dissipating static electricity from a conveyor system, the method including providing a static dissipative sprocket in electrically conductive contact between a conveyor belt of the conveyor system and a grounded drive shaft of the conveyor system.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
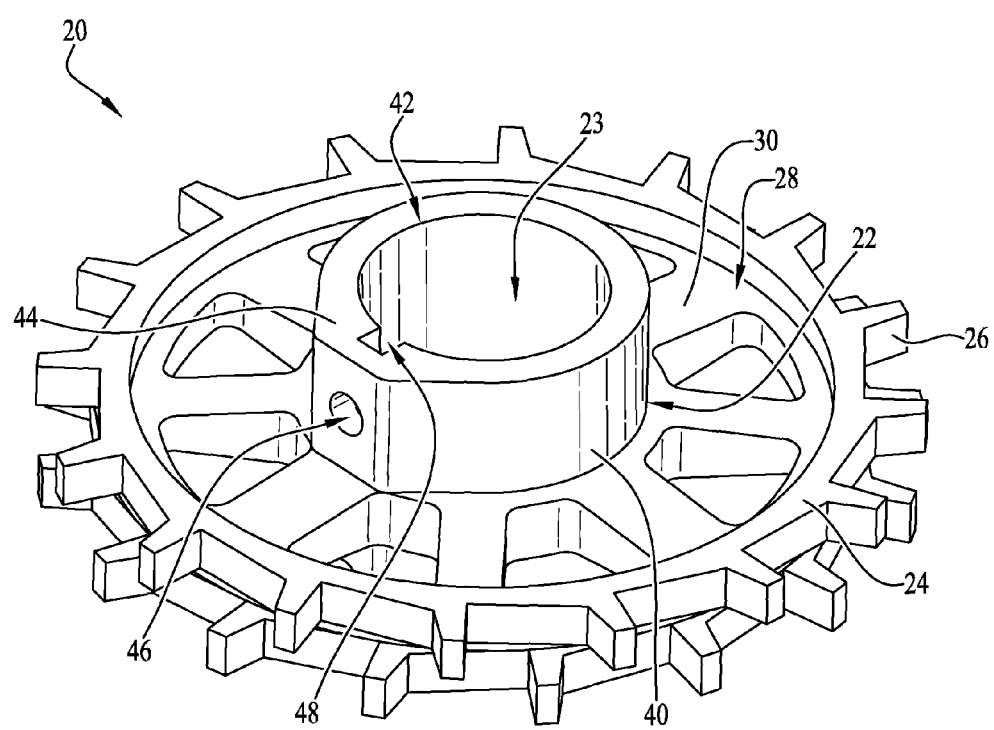
FIG. 1 is a perspective view of a static-dissipative sprocket component for a conveyor belt assembly according to an example embodiment of the present invention.

With reference now to the drawing figures, FIG. 1 shows a static dissipative sprocket or static dissipative sprocket assembly 20 according to an example embodiment of the invention. The sprocket assembly 20 generally includes a sprocket body comprising an inner hub portion 22, an outer ring or rim 24 that includes a plurality or of teeth 26 in a circumferentially spaced array around the rim, and a connection portion 28 formed of one or more spokes or flanges extending between and the inner hub and the outer ring and connecting the ring in a concentric position around the hub. The inner hub portion 22 has an inner opening 23 extending therethrough, which defines an inner circumference configured to surround a metal shaft or bar, such as a driveshaft to which the sprocket is mounted. The circumference of the opening 23 of the inner hub 22 at least as large as the circumference of the shaft. The circumference of the outer rim 24 is generally larger than the circumference of the opening 23. The teeth 26 are generally evenly spaced around the outer circumference of the ring 24. In the depicted embodiment, the sprocket 20 includes a pair of abutting outer rings 24 around a single inner hub 22. The outer rings 24 are generally the same diameter and the teeth 26 of each ring are staggered or circumferentially offset so that the teeth of the first ring are not adjacent to the teeth of the second ring. In the depicted embodiment, the connection portion 28 includes a plurality of spokes 30 extending between the inner hub 22 and the outer rings 24.

The sprocket 20 can also include integrated collars 40 abutting or extending transversely outward from either side or both sides of the inner hub portion 22. The collars 40 are generally cylindrical with a generally circular cross-section, and include an opening 42 aligned with that of the inner hub 22 to allow the metal shaft that passes through the inner hub to pass through the collars as well. The collars 40 are configured to secure the sprocket 20 to the metal shaft. The collars 40 optionally include a coupling protrusion 44 on the exterior surface. A hole 46 for receiving a set screw extends from the top of the coupling protrusion 44 to the inner surface of the collar. In the example embodiment, the collar 40 includes a keyway slot 48, such as a Woodruff key slot, cut into the inner surface of the collar and projecting outwardly from the inner circumference, for engagement with a key projecting from the driveshaft to positively couple rotational motion of the shaft to the sprocket. In the depicted embodiment, the keyway slot 48 is positioned below the set screw protrusion 44. In alternative embodiments, the sprocket includes only one collar extending from a first side of the sprocket. Integrating the shaft-mounting collar 40 into the sprocket 20 as a unitary (one-piece) integral molding results in a simpler, more cost-effective design than use of separate mounting collars to hold the sprocket in place.

The static dissipative sprocket is generally formed of one or more static dissipative plastic or polymeric materials such as for example, acetal homopolymer resins, acetal copolymers or any other material with static dissipative properties. In example embodiments, the plastic material includes an inherently dissipative polymer additive. Commercial products that can be used to form the sprocket include DuPont™ 300ATB, Delrin™ 550AF, Tecaform™ SD, Hydel™ ASD and any of Delrin™'s line of static dissipative plastics. In example embodiments, the static dissipative sprocket 20 is molded and formed as a single, unitary component, including the hub 22, spokes 30, outer ring 24, teeth 26 and collars 40. In other embodiments, the sprocket 20 can be formed or molded in two or more components that are assembled and attached together.

Figure 2:
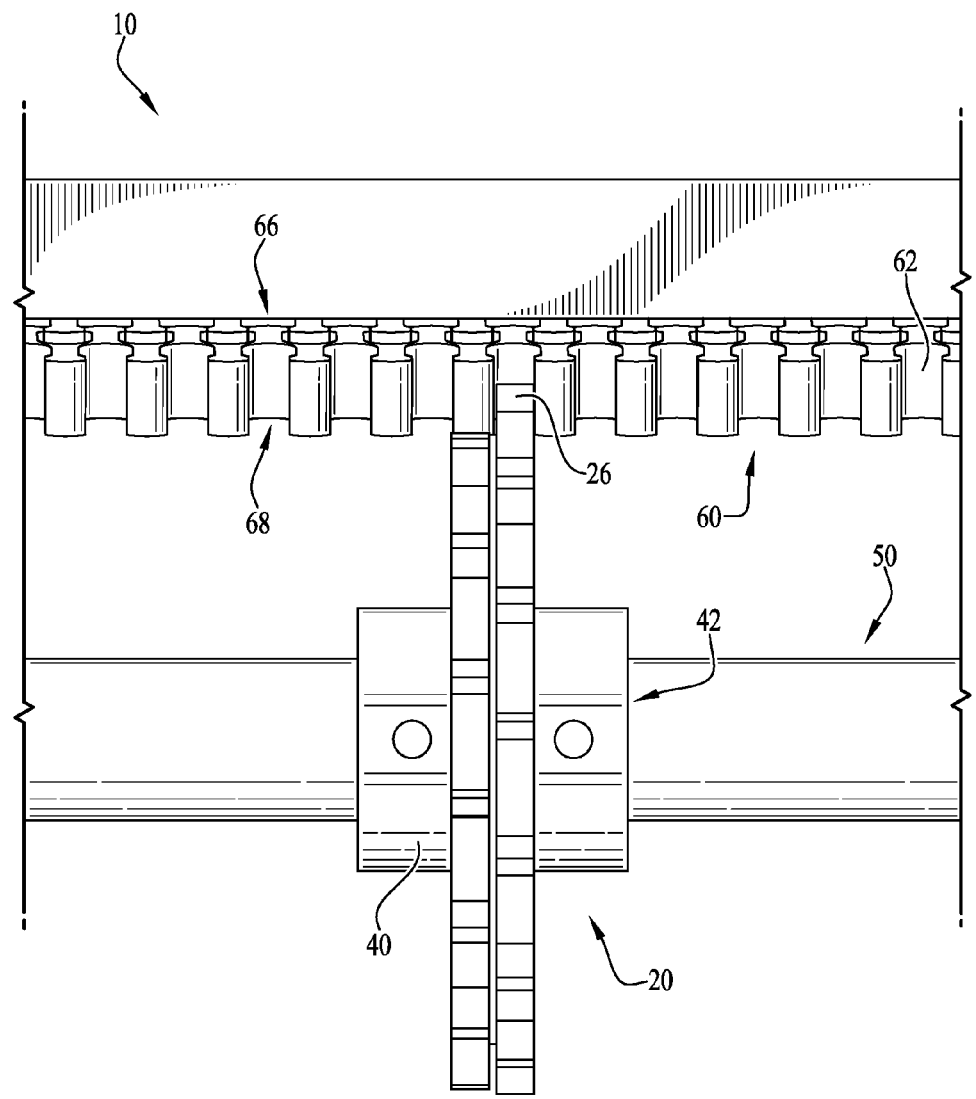
FIG. 2 is an end view of a conveyor belt system including a static-dissipative sprocket component according to an example embodiment of the present invention.

FIG. 2 shows a conveyor belt system 10 including the static dissipative sprocket 20, according to a further example embodiment of the invention. In addition to the static dissipative sprocket 20, the system 10 includes a metal bar or drive shaft 50 and a conveyor belt 60 used to transport conveyed objects such as baking pans in a commercial baking system incorporating the conveyor belt system. The metal bar or shaft 50 can be formed of steel another rigid metal. The metal shaft or bar 50 is optionally connected to a motor drive system to drive the shaft and propel the conveyor system. The metal shaft or bar 50 is preferably electrically grounded, for example by connection of a ground wire in electrically conductive contact with the shaft. The conveyor belt 60 is generally modular allowing it to create a flat transport surface and bend around a sprocket 20 to create a continuous loop. In example embodiments, the conveyor belt 60 is at least partially comprised of a static dissipative (or electrically conductive) material, such as for example a static dissipative plastic. The conveyor belt 60 generally includes a top face 66 and a bottom face 68 defining a conveyance path along a lengthwise direction. The conveyor belt generally includes a series or array of holes or catch surfaces 62 for contact with the teeth of the sprocket. In the depicted embodiment, the conveyor belt comprises a series of links 64 and the space between the links provides the conveyor belt holes or openings 62. The static dissipative sprocket 20 is attached to the metal bar or shaft 50 by feeding the metal bar or shaft through the opening 42 in the collar 40. The sprocket 20 is secured such that it rotates in concert with the metal bar 50 and preferably does not rotate independently. The metal bar 50 and sprocket 20 are positioned such that the teeth 26 of the sprocket engage the holes 62 in the conveyor belt 60, and when rotationally driven the sprocket propels the belt in a lateral or lengthwise direction.

Figure 3:
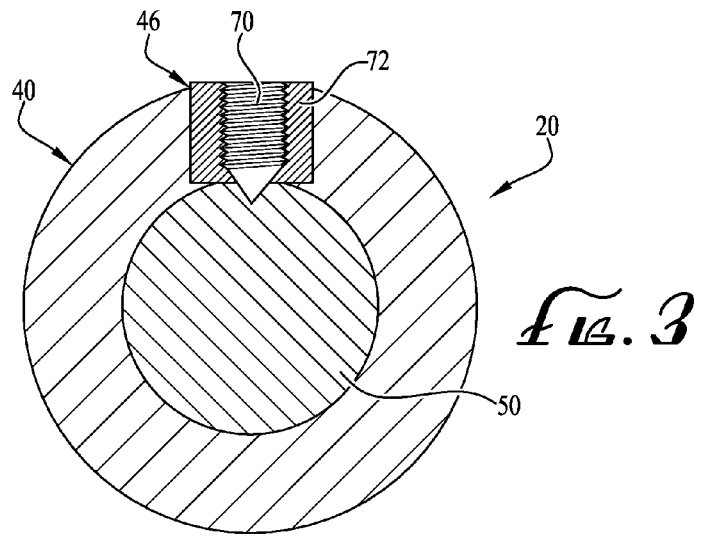
FIG. 3 is a partial cross-sectional view of the sprocket hub and drive shaft coupling portion of a conveyor belt system including a static-dissipative sprocket component according to an example embodiment of the present invention.

FIG. 3 shows details of the connection between the metal bar or shaft 50 and static dissipative sprocket 20 according to an example embodiment of the present invention. The static dissipative sprocket 20 is connected to the metal bar or shaft 50 with a set screw 70 inserted through the hole 46 in the sprocket collar 40. In the example embodiment, the set screw 70 is constructed of a metal such as steel or other electrically conductive material. The set screw 70 is inserted through the hole 46 to a depth where it preferably extends into contact with the surface of the metal bar or shaft 50, and optionally penetrates into the metal bar or shaft. If the metal bar or shaft 50 includes an insulating coating, the set screw 70 is preferably driven to a depth where the end or tip is inserted through and beyond said coating, into electrically conductive contact through the shaft to ground. In the depicted embodiment, a metal insert 72 is affixed in the hole 46 through the sprocket collar 40. In example embodiments, the metal insert 72 is formed of brass or other metal or electrically conductive metal. The insert 72 is configured to contact the inside surface of the hole 46 and contact, or surround the set screw 70, providing electrically conductive contact between the plastic sprocket material and the set screw 70, and/or between the plastic sprocket material and the drive shaft 50, to ground and dissipate static from the conveyor belt 60. In example embodiments, the metal insert 72 is female threaded to correspond with the male threaded set screw 70.

In the configuration shown in FIG. 3, the conveyor belt system 10 creates an electrically conductive path of conveyance of static electricity from the conveyor belt 60 and objects carried thereon, to the teeth 26 of the sprocket 20, through the sprocket to the sprocket collar 40, through the metal insert 72, then to the set screw 70 through to the metal bar or shaft 50, and on to the electric ground. In alternative embodiments that do not include the metal insert, the path of conveyance goes directly from the collar 40 of the sprocket 20 to the set screw 70 and/or the drive shaft 50. While only a single set screw 70 is described above for ease of explanation, the system 10 can include two set screws, one for each of the two collars 40 extending transversely on either side of the sprocket 20.

Figure 4:
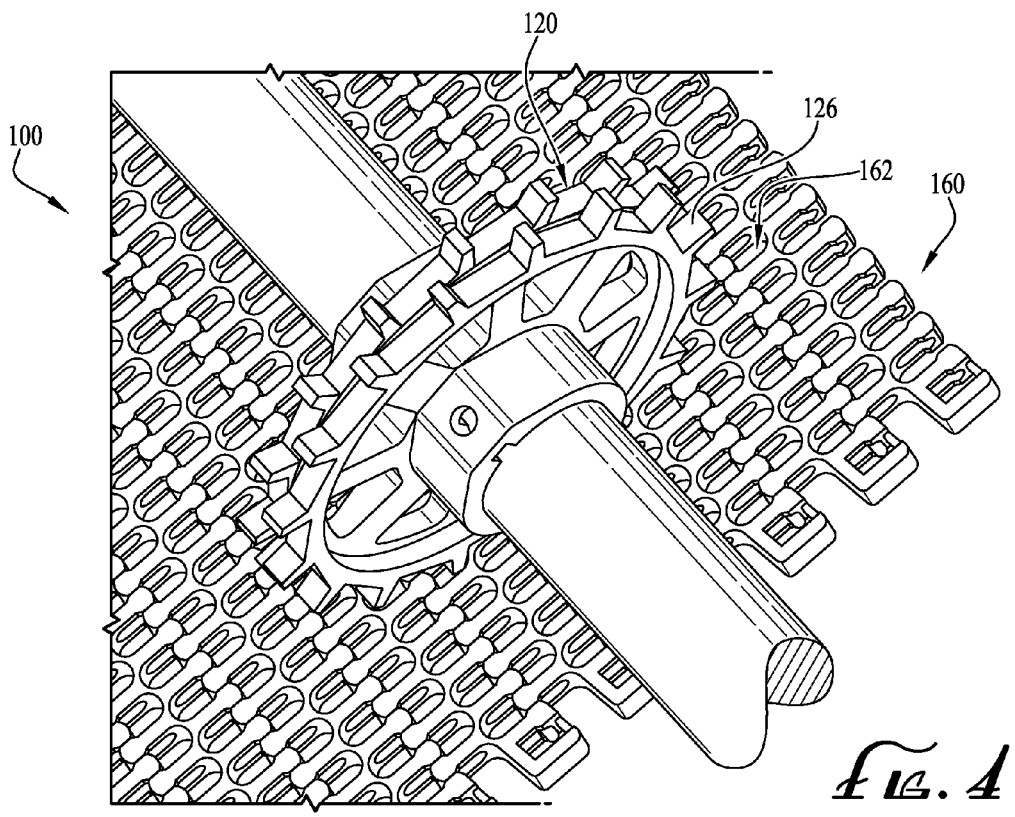
FIG. 4 is a perspective view of a conveyor belt system including a static-dissipative sprocket component according to an example embodiment of the present invention.
Figure 5:
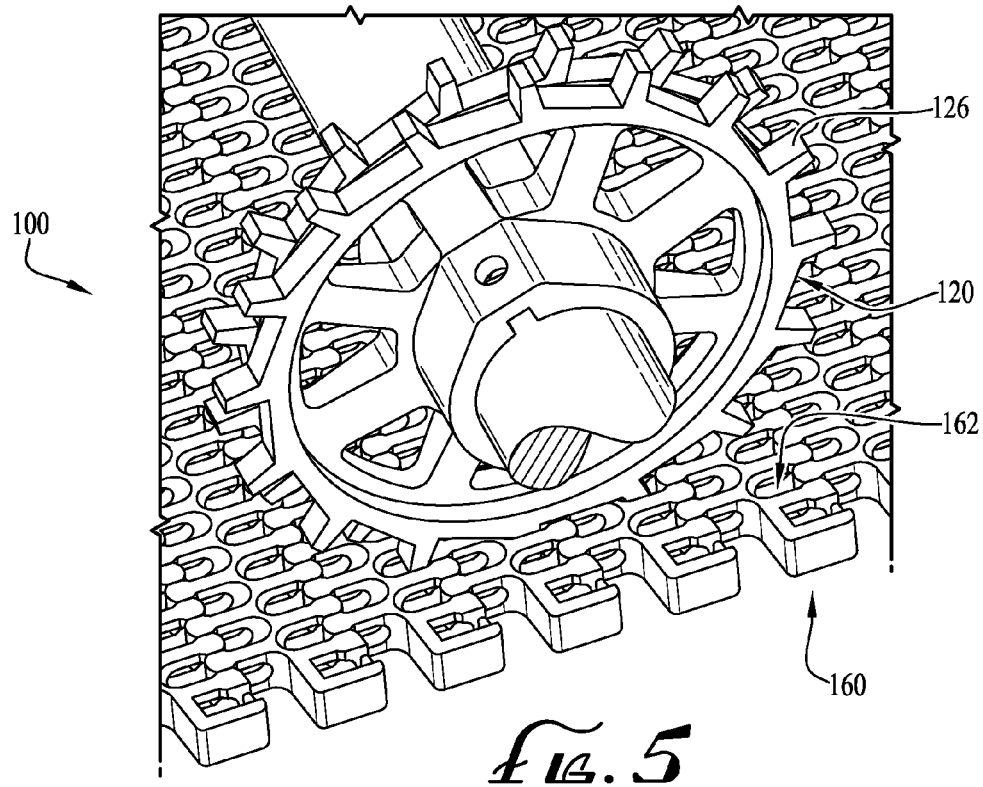
FIG. 5 is another perspective view of a conveyor belt system including a static-dissipative sprocket component according to an example embodiment of the present invention.
Figure 6:
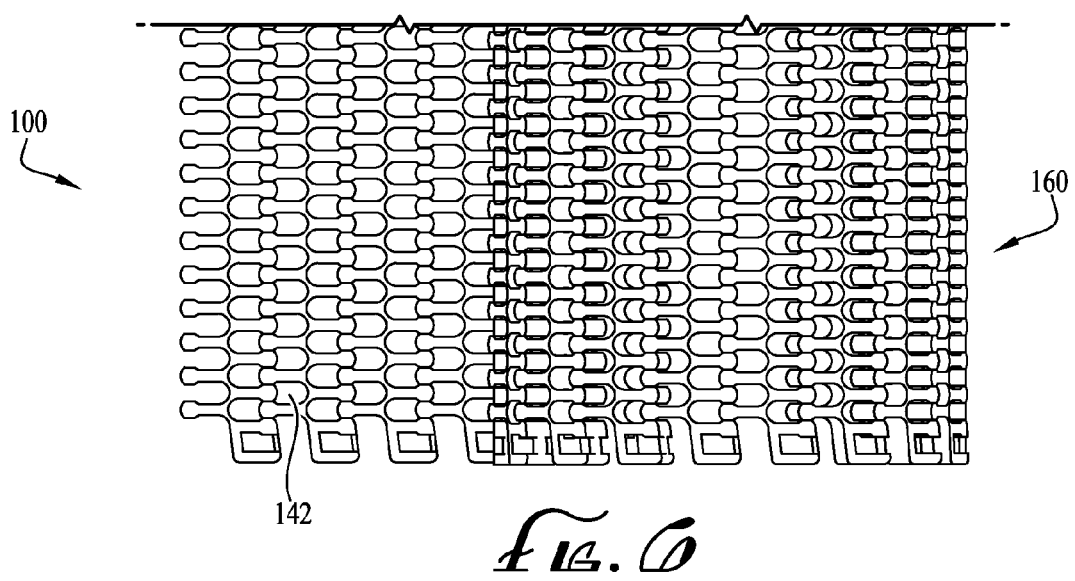
FIG. 6 is a top view of a conveyor belt system including a static-dissipative sprocket component according to an example embodiment of the present invention.

FIGS. 4-6 show a conveyor belt system 100 including a static dissipative sprocket 120 according to another example embodiment of the invention. In this embodiment, the conveyor belt 160 includes a series of holes 162 to engage the teeth 126 of the static dissipative sprocket 120. In this embodiment, the teeth 126 of the sprocket 120 are at least as long or longer than the thickness of the conveyor belt 160. The system 100 is configured such that the teeth 126 of the sprocket 120 extend from the bottom of the belt 160, through the holes 162 in the belt, to where at least a portion of the teeth extend beyond the top of the belt. As a result the teeth 126 can optionally come directly in electrically conductive contact with the objects transported on top of the conveyor belt 160, for example a metal baking pan (not shown). The contact between the sprocket teeth 126 and the metal objects allows static electricity accumulated on the metal objects to travel directly from the metal object to the sprocket and continue along the path of conveyance discussed above.

In an example mode of use, the system and components as described herein enable methods of dissipating static electricity from a conveyor system, the system employs an electric dissipative sprocket 20, which contacts both the conveyor belt 60 of the conveyor system and a grounded metal bar or drive shaft 50 to create an electrically conductive path of conveyance for dissipating static electricity generated by operation of the conveyor system.

While in the embodiments described above, one sprocket is shown for ease of explanation, it should be appreciated that a conveyor belt system may include a plurality of sprockets, for example in pairs along either side of a conveyor belt, mounted on one or more drive or idler shafts spaced along the lengthwise conveyance path of the conveyor belt, configured to dissipate static electricity substantially as described.

While the claimed invention has been shown and described in example forms, it will be apparent to those skilled in the art that many modifications, additions, and deletions can be made therein without departing from the spirit and scope of the invention as defined by the following claims.

What is claimed is:

1. A static dissipative sprocket assembly for a conveyor system, the sprocket assembly comprising a sprocket body comprising a hub having a central opening defining an inner circumference, a rim concentrically surrounding the hub and having an outer circumference greater than the inner circumference of the hub, a plurality of teeth projecting in a spaced array about the outer circumference of the rim, wherein the sprocket body comprises a static dissipative material, and an electrically conductive metal insert extending at least partially through the hub and having an interior surface exposed for electrically conductive contact along the inner circumference of the central opening of the hub, wherein the electrically conductive metal insert comprises brass.

2. The static dissipative sprocket assembly of claim 1, wherein the electrically conductive metal insert has a threaded opening defined therein, and wherein the sprocket assembly further comprises an electrically conductive metal set-screw configured for threaded engagement within the threaded opening of the electrically conductive metal insert.

3. The static dissipative sprocket assembly of claim 1, wherein the static dissipative material of the sprocket body comprises a static dissipative polymeric material.

4. The static dissipative sprocket assembly of claim 1, wherein the rim comprises first and second outer rings, each of the first and second outer rings having a spaced array of teeth projecting therefrom, wherein the array of teeth of the first outer ring is circumferentially offset from the array of teeth of the second outer ring.

5. The static dissipative sprocket assembly of claim 1, wherein the hub of the sprocket body further comprises a collar extending transversely outwardly from at least one side of the hub.

6. The static dissipative sprocket assembly of claim 5, wherein the hub of the sprocket body comprises collars extending transversely outwardly from both sides of the hub.

7. The static dissipative sprocket assembly of claim 1, wherein the sprocket body further comprises a plurality of spokes extending between the hub and the rim.

8. The static dissipative sprocket assembly of claim 1, wherein the hub further defines a keyway slot projecting outwardly from the inner circumference.

9. The static dissipative sprocket assembly of claim 1, wherein the sprocket body comprises an integral unitary component incorporating the hub, the rim and the plurality of teeth.

10. A conveyor system comprising:
a plastic conveyor belt having a top face and a bottom face and defining a lengthwise direction extending along a conveyance path, the conveyor belt comprising at least one array of openings spaced in the lengthwise direction along at least one of the top face and the bottom face; and a static dissipative sprocket assembly comprising a hub having a central opening defining an inner circumference, a rim concentrically surrounding the hub and having an outer circumference, and a plurality of teeth spaced around the outer circumference of the rim for cooperative engagement with the array of openings of the conveyor belt, wherein the sprocket body comprises a static dissipative material;

wherein the array of openings of the conveyor belt extend through the top face and the bottom face of the conveyor belt, and wherein the teeth of the sprocket assembly define a length sufficient to extend through the top face and the bottom face of the conveyor belt.

11. The conveyor system of claim 10, wherein the static dissipative sprocket assembly further comprises an electrically conductive metal insert extending at least partially through the hub and having an interior surface exposed for electrically conductive contact along the inner circumference of the central opening of the hub.

12. The conveyor system of claim 11, wherein the electrically conductive metal insert has a threaded opening defined therein, and wherein the sprocket assembly further comprises an electrically conductive metal set-screw configured for threaded engagement within the threaded opening of the electrically conductive metal insert.

13. The conveyor system of claim 11, wherein the hub of the sprocket body further comprises a collar extending transversely outwardly from at least one side of the hub.

14. The conveyor system of claim 11, wherein the sprocket body comprises an integral unitary component incorporating the hub, the rim and the teeth.

15. The conveyor system of claim 11, further comprising a drive shaft configured for engagement within the central opening of the hub of the sprocket assembly to rotationally drive the sprocket assembly and propel the conveyor belt in the lengthwise direction.

16. The conveyor system of claim 15, wherein an electrically conductive grounding path is defined from the conveyor belt, through the sprocket assembly, to the drive shaft.

17. The conveyor system of claim 11, wherein the conveyance path extends through a baking system.

18. The conveyor system of claim 17, further comprising a baking container for conveyance on the conveyor belt along the conveyance path through the baking system.

19. A static dissipative sprocket assembly for a conveyor system, the sprocket assembly comprising a sprocket body comprising a hub having a central opening defining an inner circumference, a rim concentrically surrounding the hub and having an outer circumference greater than the inner circumference of the hub, and a plurality of teeth projecting in a spaced array about the outer circumference of the rim, wherein the sprocket body comprises a static dissipative material, and wherein the rim comprises first and second outer rings, each of the first and second outer rings having a spaced array of teeth projecting therefrom, wherein the array of teeth of the first outer ring is circumferentially offset from the array of teeth of the second outer ring.

20. The static dissipative sprocket assembly of claim 19, further comprising an electrically conductive metal insert extending at least partially through the hub and having an interior surface exposed for electrically conductive contact along the inner circumference of the central opening of the hub.

21. The static dissipative sprocket assembly of claim 20, wherein the electrically conductive metal insert has a threaded opening defined therein, and wherein the sprocket assembly further comprises an electrically conductive metal set-screw configured for threaded engagement within the threaded opening of the electrically conductive metal insert.

22. The static dissipative sprocket assembly of claim 20, wherein the electrically conductive metal insert comprises brass.

23. The static dissipative sprocket assembly of claim 19, wherein the static dissipative material of the sprocket body comprises a static dissipative polymeric material.

24. The static dissipative sprocket assembly of claim 19, wherein the hub of the sprocket body further comprises a collar extending transversely outwardly from at least one side of the hub.

25. The static dissipative sprocket assembly of claim 19, wherein the hub of the sprocket body comprises collars extending transversely outwardly from both sides of the hub.

26. The static dissipative sprocket assembly of claim 19, wherein the sprocket body further comprises a plurality of spokes extending between the hub and the rim.

27. The static dissipative sprocket assembly of claim 19, wherein the hub further defines a keyway slot projecting outwardly from the inner circumference.

28. The static dissipative sprocket assembly of claim 19, wherein the sprocket body comprises an integral unitary component incorporating the hub, the rim and the plurality of teeth.

* * * * *